United States Patent [19]
Yeo

[11] Patent Number: 5,792,024
[45] Date of Patent: Aug. 11, 1998

[54] METHOD AND APPARATUS FOR CONTROLLING A DAMPER CLUTCH

[75] Inventor: Chang-Gi Yeo, Ulsan Kyungsangnam-do, Rep. of Korea

[73] Assignee: Hyundai Motor Co., Ltd., Seoul, Rep. of Korea

[21] Appl. No.: 771,412

[22] Filed: Dec. 20, 1996

[30] Foreign Application Priority Data

Dec. 20, 1995 [KR] Rep. of Korea ............... 1995 52477

[51] Int. Cl.$^6$ ............................................. B60K 41/02
[52] U.S. Cl. ........................... 477/174; 477/64; 477/74; 477/171
[58] Field of Search ................... 477/169, 170, 477/171, 173, 174, 62, 63, 64, 65, 74, 86; 701/51, 53, 52, 67

[56] References Cited

U.S. PATENT DOCUMENTS

| | | | |
|---|---|---|---|
| 3,665,787 | 5/1972 | Wilkinson | 477/62 X |
| 4,056,177 | 11/1977 | Ahlen et al. | 477/174 X |
| 4,441,385 | 4/1984 | Taga et al. | 477/63 |
| 4,495,576 | 1/1985 | Ito | 477/65 |
| 4,584,906 | 4/1986 | Nagaoka et al. | 477/120 |
| 5,611,752 | 3/1997 | Kamada et al. | 477/174 X |
| 5,627,750 | 5/1997 | Kono et al. | 477/176 X |
| 5,697,867 | 12/1997 | Kono et al. | 477/176 |

*Primary Examiner*—Charles A. Marmor
*Assistant Examiner*—Peter T. Kwon

[57] ABSTRACT

The method and apparatus for controlling a damper clutch in a torque converter of a vehicle includes a plurality of sensors which sense the operating conditions of the vehicle. Based on the sensed operating conditions of the vehicle, a control unit determines whether the vehicle is driving in an area congested with traffic, and prohibits operation of the damper clutch when it is determined that the vehicle is driving in an area congested with traffic.

22 Claims, 4 Drawing Sheets

METHOD AND APPARATUS FOR CONTROLLING A DAMPER CLUTCH

BACKGROUND OF THE INVENTION

1. Field of the Invention

The present invention relates to a method and apparatus for controlling the damper clutch in a torque converter of a vehicle; and more particularly, to prohibiting operation of the damper clutch when the vehicle is travelling in an area congested with traffic.

2. Description of Related Art

FIG. 3 illustrates a conventional damper clutch. As shown in FIG. 3, the output shaft 100 of an engine is connected to an impeller 104 of a torque converter 110. The impeller 104 is in fluid communication with a turbine 106 of the torque converter 110. A stator 108 facilitates the fluid communication. As further shown in FIG. 3, the turbine 106 is connected to an input shaft 112 of an automatic transmission (A/T), and a damper clutch 102 is connected to the turbine 106 and the output shaft 100 of the engine.

During operation, the impeller 104 transmits the power generated by the engine via a fluid medium to the turbine 106 which in turn transmits the power to the input shaft 112 of the automatic transmission. Typically, the damper clutch 102 is engaged when the speed of the turbine 106 approaches the speed of the impeller 104. Once engaged, the power generated by the engine is transmitted to the input shaft 112 of the automatic transmission without loss; thus, improving fuel efficiency.

When a vehicle is driven in an area congested with traffic, such as a downtown area, the driver must frequently make quick stops and starts. As a result, the damper clutch 102 is repeatedly being engaged and disengaged. Unfortunately, because of these frequent starts and stops, and particularly when the torque converter 110 is disengaged during a quick stop, the difference in rotation speeds between the impeller 104 and turbine 106 increases at a rapid rate. This sudden and large difference between impeller and turbine rotation speeds generates a shock which occupants of the vehicle find uncomfortable.

SUMMARY OF THE INVENTION

It is an object of the present invention to provide a method and apparatus for controlling a damper clutch which overcomes the disadvantages discussed above.

It is further an object of the present invention to provide a method and apparatus for controlling a damper clutch which prohibits operation of the damper clutch when the vehicle is travelling in an area congested with traffic.

These and other objectives are achieved by providing a method for controlling a damper clutch in a torque converter of a vehicle, comprising (a) sensing operating conditions of said vehicle; (b) determining, based on said sensed operating conditions of said vehicle, whether said vehicle is driving in an area congested with traffic; and (c) prohibiting operation of said damper clutch when said step (b) determines that said vehicle is driving in an area congested with traffic.

These and other objectives are further achieved by providing an apparatus for controlling a damper clutch in a torque converter of a vehicle, comprising sensing means for sensing operating conditions of said vehicle; determining means for determining, based on said sensed operating conditions of said vehicle, whether said vehicle is driving in an area congested with traffic; and control means for prohibiting operation of said damper clutch when said determining means determines that said vehicle is driving in an area congested with traffic.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
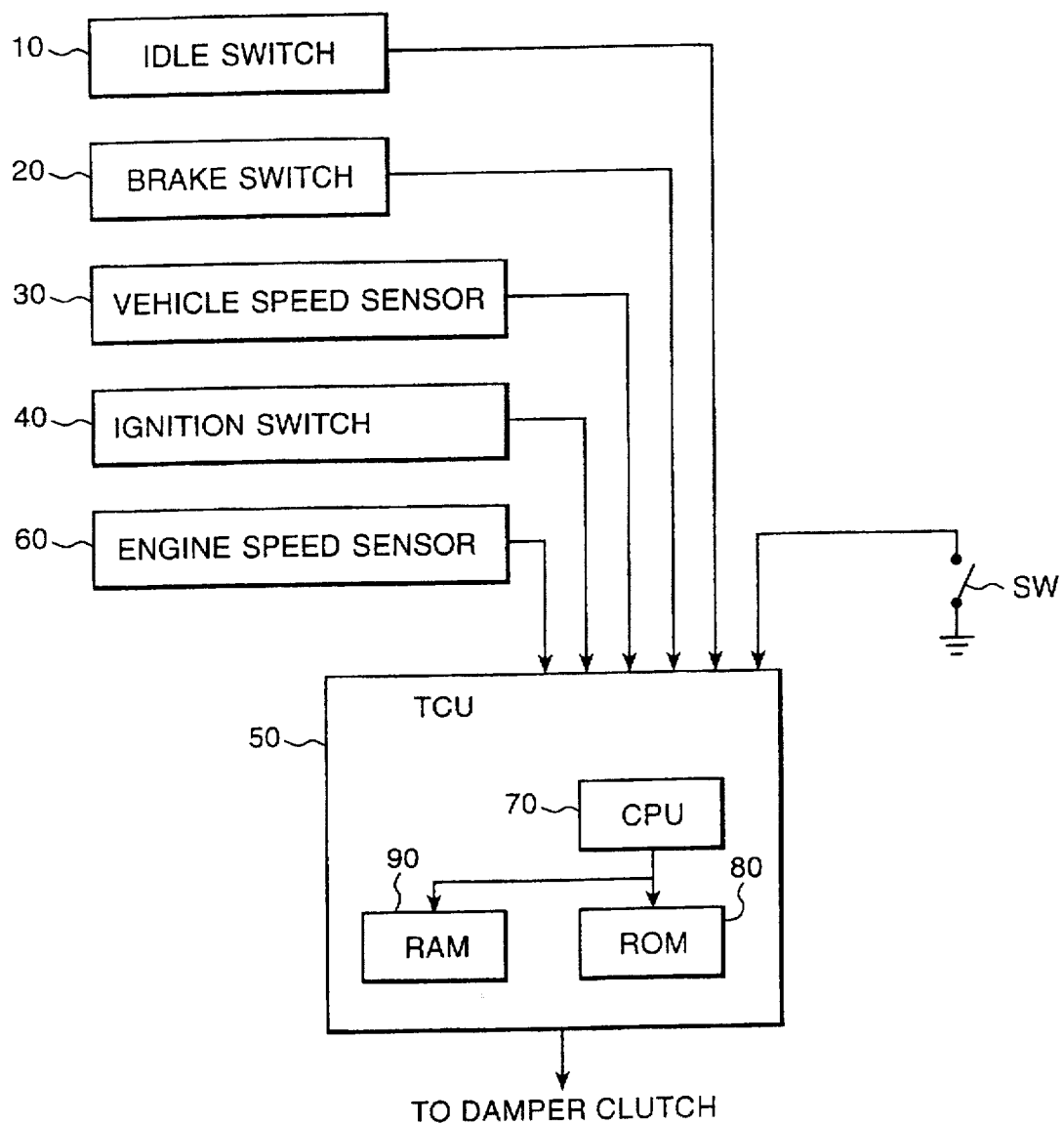
FIG. 1 illustrates the apparatus for controlling the damper clutch of an automatic transmission according to the present invention.

FIG. 1 illustrates the apparatus for controlling the damper clutch according to the present invention. As shown, the apparatus includes an idle switch 10, a brake switch 20, a vehicle speed sensor 30, an ignition switch 40, an engine speed sensor 60, and an operator switch SW. The idle switch 10 detects when an engine of the vehicle is idling, the brake switch 20 detects when an operator presses the brake pedal of the vehicle, the vehicle speed sensor 30 detects the vehicle speed, the ignition switch 40 detects when the vehicle is started, and the engine speed sensor 60 detects the output speed of the engine of the vehicle. The operator switch SW is a manually manipulated switch, connected to ground, for enabling and disabling damper clutch control.

The idle switch 10, the brake switch 30, the vehicle speed sensor 30, the ignition switch 40, the engine speed sensor 60, and the operator switch SW are connected to a transmission control unit (TCU) 50. The TCU 50 includes a CPU 70 connected to a ROM 80 and a RAM 90. The ROM 80 stores programs run by the TCU 50 to control operation of the automatic transmission and the damper clutch. The RAM 90 stores the output of the various sensors connected to the TCU 50, and intermediate values calculated by the CPU 70 during execution of the programs stored in the ROM 80.

Figure 2A:
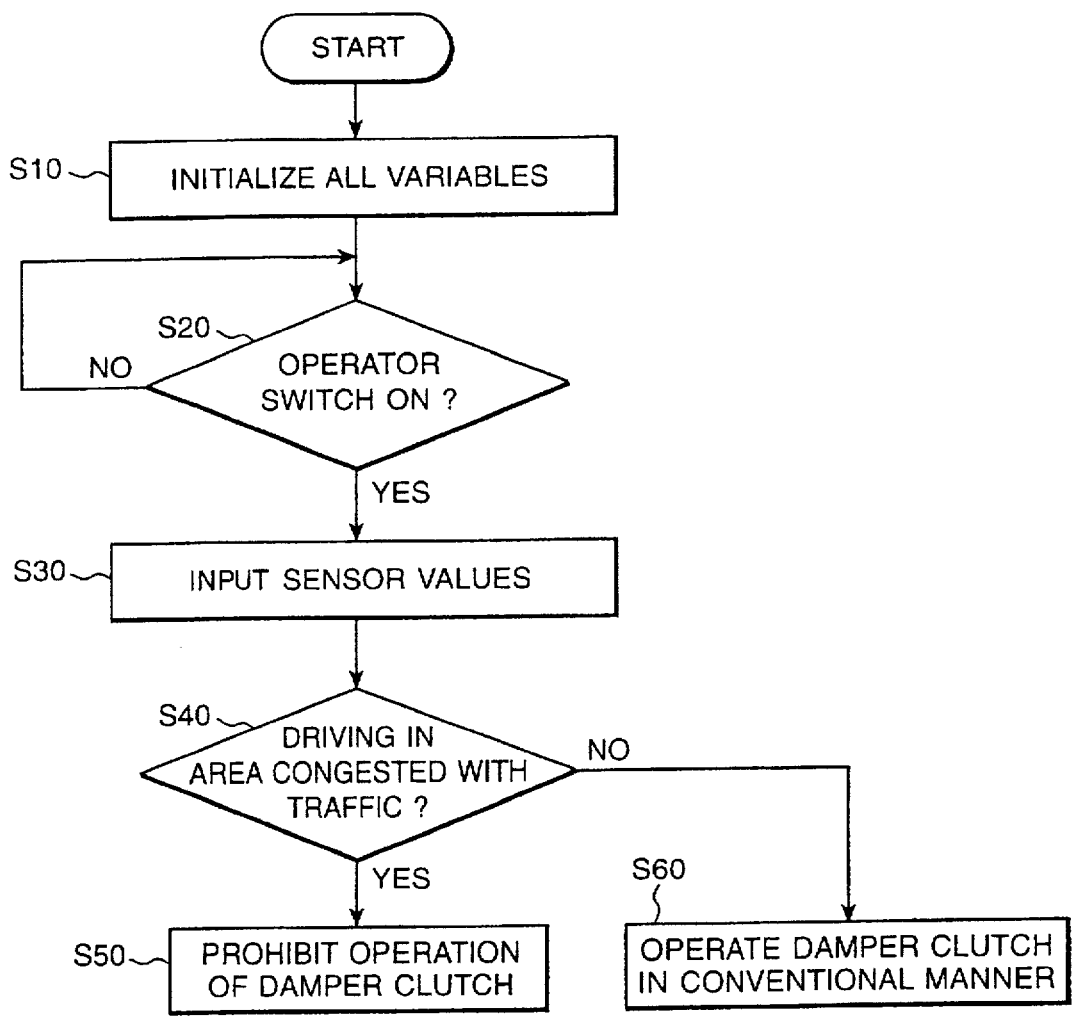
FIGS. 2A and 2B illustrate flow charts of the method for controlling the damper clutch of an automatic transmission according to the present invention.

FIG. 2A illustrates the flow chart of the method for controlling the damper clutch according to the present invention. The program implementing this flow chart is stored in ROM 80. As shown in FIG. 2A, in step S10, the TCU 50 initializes all variables used in performing the damper clutch control method. Then, in step S20, the TCU 50 determines whether or not the operator switch SW is on, i.e., closed. If the operator switch is not closed, then the TCU continually repeats step S20 until the operator switch SW is closed. In this manner, the operator can deactivate damper clutch control by turning off, opening, the operator switch SW.

If the operator switch SW is on, then processing proceeds to step S30 wherein the TCU 50 inputs sensor values from the idle switch 10, the brake switch 20, the vehicle speed sensor 30, the ignition switch 40, and the engine speed sensor 60. Next, in step S40, the TCU 50 determines whether or not the vehicle is driving in an area congested with traffic such as a downtown area. This step is illustrated in detail in FIG. 2B.

Figure 2B:
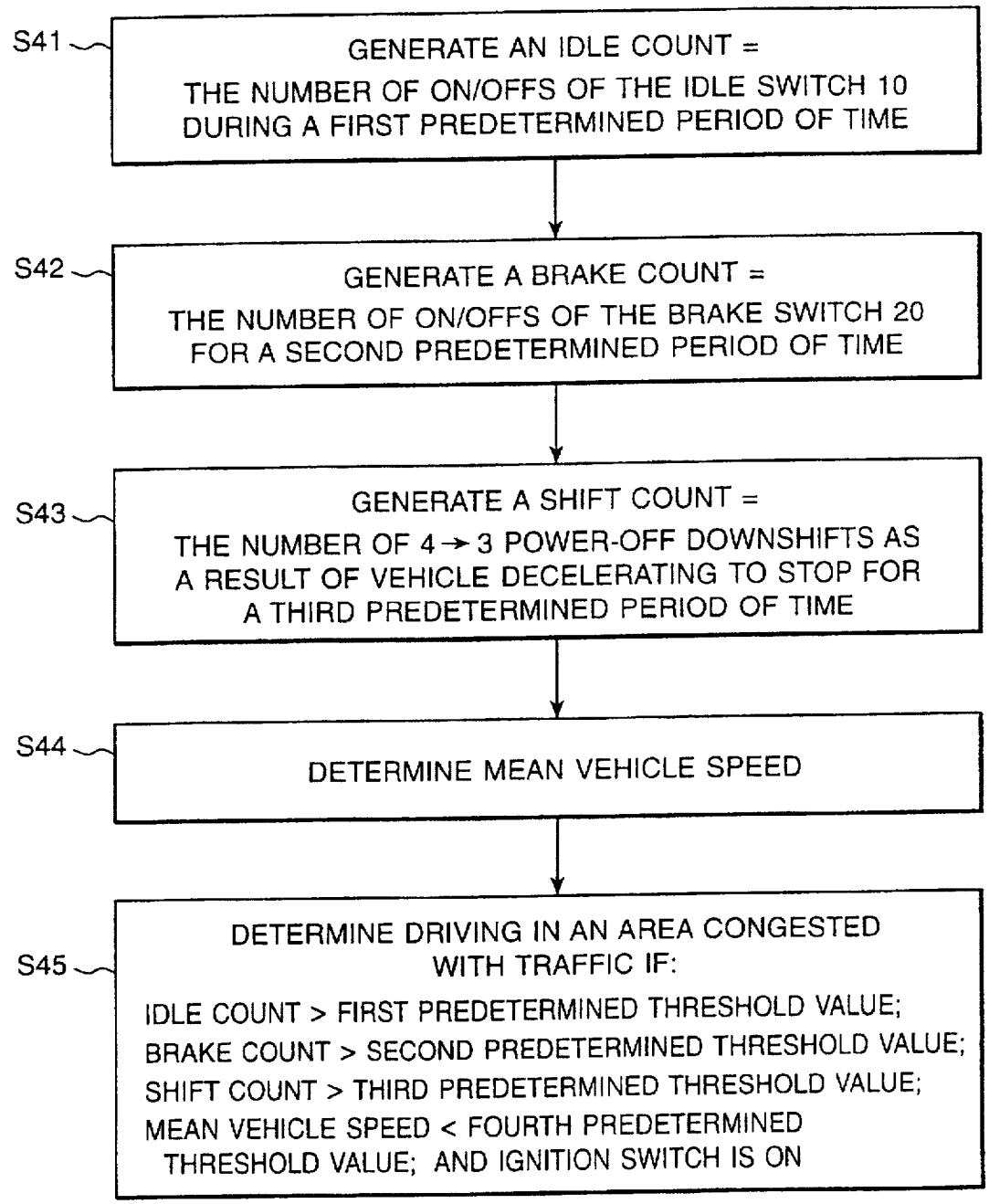
Figure 3:
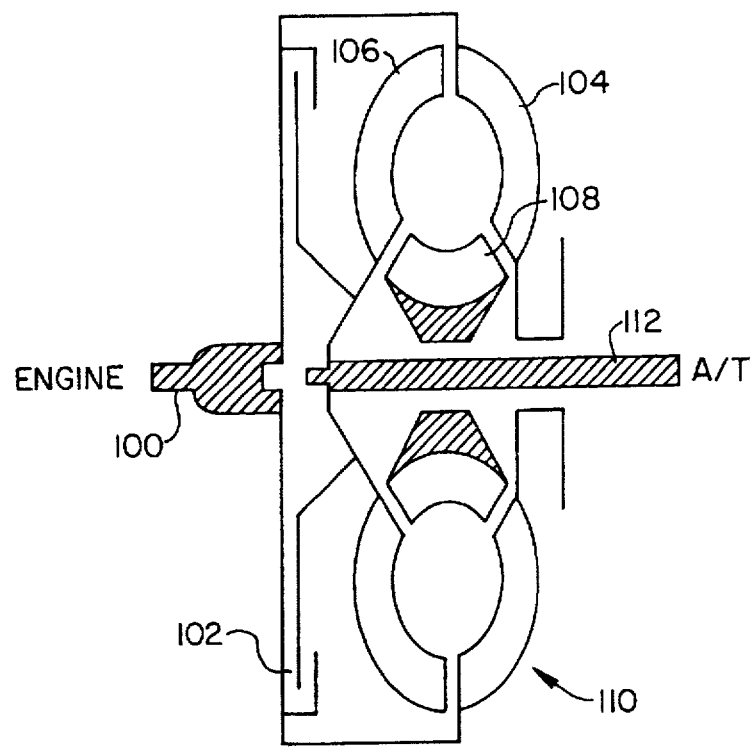
FIGS. 3 illustrates a conventional damper clutch.

As shown in FIG. 2B, the TCU 50 generates an idle count which is equal to the number of times the idle switch 10 detects the idle state of the engine during a first predetermined period of time in step S41. In step S42, the TCU 50 generates a brake count equal to the number of times the brake switch 20 detects the operation of the brake pedal during a second predetermined period of time.

Then, in step S43, the TCU 50 generates a downshift count equal to the number of times the TCU 50 determines that a particular shift operation has occurred during a third predetermined period of time. As is well known in the art, by comparing the ratio of the engine speed output by the engine speed sensor 60 to the vehicle speed output by the vehicle speed sensor 30, the TCU 50 can determine what gear the automatic transmission is in. By monitoring gear changes, the TCU 50 can monitor up-shifts and down-shifts.

The particular shift operation counted by the TCU 50 is a 4–3 power-off downshift as a result of the vehicle decelerating to stop. As is known in the art, an automatic transmission can perform a power-on downshift and a power-off downshift. The power-on downshift occurs as a result of an increase in the load placed on the engine (e.g., an operator indicated desire to accelerate the vehicle).

The power-off downshift occurs in two ways. The first way concerns vehicles having an automatic transmission with overdrive. In drive trains providing overdrive, the operator is supplied with a manual control for selecting whether overdrive should be used. When overdrive is selected, the highest gear of the automatic transmission is typically fourth gear, while when overdrive is not selected the highest gear is typically third gear. Consequently, if the automatic transmission is in fourth gear with the overdrive on and an operator turns the overdrive off, then the automatic transmission will downshift to third gear. The second way for a power-off downshift to be achieved is when the vehicle decelerates because the driver has slowed the vehicle to a stop; generally requiring that the operator apply the brakes at some point. In step S43, the TCU 50 only detects the number of time this second type of power-off downshift occurs for a fourth gear to third gear downshift.

Next, in step S44, the TCU 50 determines the average or mean vehicle speed based on the output from the vehicle speed sensor 30.

While steps S41–S44 have been described and illustrated in FIG. 2B as occurring in sequential order, these steps can be performed simultaneously. Then, in step S45, the TCU 50 determines if the vehicle is driving in an area congested with traffic. The TCU 50 concludes that the vehicle is driving in an area congested with traffic if (1) the idle count is greater than a first predetermined threshold value, (2) the brake count is greater than a second predetermined threshold value, (3) the shift count is greater than a third predetermined threshold value, (4) the mean vehicle speed is less than a fourth predetermined threshold value, and (5) the ignition switch 40 outputs a signal indicating that the ignition switch is on. As will be readily appreciated by those skilled in the art from the foregoing disclosure, the first, second, and third predetermined periods of time and the first, second, third, and fourth predetermined threshold values can be chosen based on desired operating characteristics.

Returning to FIG. 2A, if the TCU 50 determines in step S40 that the vehicle is not driving in an area congested with traffic then processing proceeds to step S60. In step S60, the TCU 50 controls the operation of the damper clutch in the conventional manner.

If, however, in step S40 the TCU 50 determines that the vehicle is driving in an area congested with traffic, then in step S50, the TCU 50 prohibits operation of the damper clutch.

By prohibiting operation of the damper clutch in an area congested with traffic, the method and apparatus for controlling the damper clutch according to the present invention avoids repetitively engaging and disengaging the damper clutch during periods when the vehicle quickly accelerates and decelerates; thereby, eliminating undesirable shocks.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. A method for controlling a damper clutch in a torque converter of a vehicle, comprising:
   (a) sensing operating conditions of said vehicle;
   (b) determining, based on said sensed operating conditions of said vehicle, whether said vehicle is driving in an area congested with traffic; and
   (c) prohibiting operation of said damper clutch when said step (b) determines that said vehicle is driving in an area congested with traffic.

2. The method of claim 1, wherein said step (a) comprises:
   (a1) sensing an idle state of an engine of said vehicle;
   (a2) sensing operation of a brake pedal of said vehicle; and
   (a3) sensing a particular shifting operation of an automatic transmission of said vehicle.

3. The method of claim 2, wherein said step (a3) senses when an automatic transmission of said vehicle shifts from a fourth speed state to a third speed state before stopping as a result of braking in a power-off state.

4. The method of claim 1, wherein said step (b) determines whether said vehicle is driving in a downtown area.

5. The method of claim 1, wherein said step (a) includes,
   (a1) sensing a particular operating state of said engine;
   (a2) sensing at least one particular driving state of said vehicle;
   (a3) sensing a particular shifting operation of an automatic transmission of said vehicle; and
said step (b) includes,
   (b1) counting a first number of times said step (a1) senses said particular operating state of said engine during a first predetermined period of time;
   (b2) counting a second number of times said step (a2) senses said particular driving state during a second predetermined period of time;
   (b3) counting a third number of times said step (a3) senses said particular shifting operation during a third predetermined period of time;
   (b4) determining said vehicle is driving in an area congested with traffic when said first, second, and third number exceed a first, second, and third predetermined value, respectively.

6. The method of claim 5, wherein said step (a2) includes,
   (a21) sensing operation of a brake pedal of said vehicle.

7. The method of claim 5, wherein said step (a2) includes, (a21) sensing a speed of said vehicle.

8. The method of claim 2, wherein said step (a) further comprises:

(a4) sensing a speed of said vehicle.

9. The method of claim 8, wherein said step (b) comprises:

(b1) counting a first number of times said step (a1) senses said idle state of said engine during a first predetermined period of time;

(b2) counting a second number of times said step (a2) senses operation of said brake pedal during a second predetermined period of time;

(b3) counting a third number of times said step (a3) senses said particular shifting operation during a third predetermined period of time;

(b4) determining a mean vehicle speed of said vehicle based on said sensed vehicle speed;

(b5) determining said vehicle is driving in an area congested with traffic when said first, second, and third number exceed a first, second, and third predetermined value, respectively, and said mean vehicle speed is less than a fourth predetermined value.

10. The method of claim 1, further comprising:

(d) controlling said damper clutch according to said sensed operating conditions of said vehicle when said step (c) determines that said vehicle is not driving in an area congested with traffic.

11. The method of claim 1, further comprising:

(d) receiving operator input on whether to perform damper clutch control; and (e) prohibiting operation of said damper clutch when said received operator input indicates not to perform damper clutch control.

12. An apparatus for controlling a damper clutch in a torque converter of a vehicle, comprising:

sensing means for sensing operating conditions of said vehicle;

determining means for determining, based on said sensed operating conditions of said vehicle, whether said vehicle is driving in an area congested with traffic; and control means for prohibiting operation of said damper clutch when said determining means determines that said vehicle is driving in an area congested with traffic.

13. The apparatus of claim 12, wherein said sensing means comprises:

an idle sensor sensing an idle state of an engine of said vehicle;

brake sensor sensing operation of a brake pedal of said vehicle; and shift sensing means for sensing a particular shifting operation of an automatic transmission of said vehicle.

14. The apparatus of claim 13, wherein said shift sensing means senses when an automatic transmission of said vehicle shifts from a fourth speed state to a third speed state before stopping as a result of braking in a power-off state.

15. The apparatus of claim 12, wherein said determining means determines whether said vehicle is driving in a downtown area.

16. The apparatus of claim 12, wherein said sensing means includes, operating state sensing means for sensing a particular operating state of said engine;

driving state sensing means for sensing at least one particular driving state of said vehicle;

shift sensing means for sensing a particular shifting operation of an automatic transmission of said vehicle;

said determining means counts a first number of times said operating state sensing means senses said particular operating state of said engine during a first predetermined period of time, counts a second number of times said driving state sensing means senses said particular driving state during a second predetermined period of time, counts a third number of times said shift sensing means senses said particular shifting operation during a third predetermined period of time, and determines said vehicle is driving in an area congested with traffic when said first, second, and third number exceed a first, second, and third predetermined value, respectively.

17. The apparatus of claim 16, wherein said driving state sensing means includes a brake sensor sensing operation of a brake pedal of said vehicle.

18. The apparatus of claim 16, wherein said driving state sensing means includes a vehicle speed sensor sensing a speed of said vehicle.

19. The apparatus of claim 13, wherein said sensing means further comprises:

a vehicle speed sensor sensing a speed of said vehicle.

20. The apparatus of claim 19, wherein said determining means counts a first number of times said idle sensor senses said idle state of said engine during a first predetermined period of time, counts a second number of times said brake sensor senses operation of said brake pedal during a second predetermined period of time, counts a third number of times said step shift sensing means senses said particular shifting operation during a third predetermined period of time, determines a mean vehicle speed of said vehicle based on said sensed vehicle speed, and determines said vehicle is driving in an area congested with traffic when said first, second, and third number exceed a first, second, and third predetermined value, respectively, and said mean vehicle speed is less than a fourth predetermined value.

21. The apparatus of claim 12, wherein said control means controls said damper clutch according to said sensed operating conditions of said vehicle when said determining means determines that said vehicle is not driving in an area congested with traffic.

22. The apparatus of claim 12, further comprising:

switch means for receiving operator input on whether to perform damper clutch control; and wherein said control means prohibits operation of said damper clutch when operator input received via said switch means indicates not to perform damper clutch control.

* * * * *